United States Patent [19]

Pieters et al.

[11] 3,902,011

[45] *Aug. 26, 1975

[54] IMAGE ANALYSING

[75] Inventors: Leon Andre Pieters, Cambridge; James Frank Wren, Wrestlingworth, both of England

[73] Assignee: Meldreth Electronics Limited, Cambridge, England

[ * ] Notice: The portion of the term of this patent subsequent to July 3, 1990, has been disclaimed.

[22] Filed: May 9, 1973

[21] Appl. No.: 358,580

Related U.S. Application Data

[63] Continuation of Ser. No. 88,543, Nov. 12, 1970, Pat. No. 3,743,772.

[52] U.S. Cl. .................................................. 178/7.2
[51] Int. Cl.$^2$.................................................. H04N 5/38
[58] Field of Search.............................. 178/6.8, 7.2

[56] References Cited

UNITED STATES PATENTS

| | | | |
|---|---|---|---|
| 2,131,892 | 10/1938 | Iams | 178/7.2 |
| 2,169,714 | 8/1939 | Urtel | 178/7.2 |
| 2,202,511 | 5/1940 | Andrieu | 178/7.2 |

*Primary Examiner*—Richard Murray
*Attorney, Agent, or Firm*—Browne, Beveridge, DeGrandi & Kline

[57] ABSTRACT

The invention provides a method and apparatus for correcting shading distortion in a source of scanned video signal. A multiple location store is provided for storing a signal indicative of the shading correction required at each of a number of selected, spaced apart points in the scannable region of the source and signal interpolation means is provided for interpolating between the stores values of correction in both line and frame scan directions for other points in the region.

The invention also provides a method and apparatus for loading the correction signals into the store locations automatically during a number of frame scans of the region. This is achieved by correcting the video signal at each point by a known amount, comparing the corrected signal with a reference signal and storing a signal indicative of this amount of correction if the comparison indicates that the correction has improved the shading of the video signal. The final correction signal stored at each store location is derived by a method of successive approximations.

9 Claims, 13 Drawing Figures

| | | | |
|---|---|---|---|
| $A_1$ | $B_1$ | $C_1$ | $D_1$ |
| $A_2$ | $B_2$ | $C_2$ | $D_2$ |
| $A_3$ | $B_3$ | $C_3$ | $D_3$ |
| $A_4$ | $B_4$ | $C_4$ | $D_4$ |

IMAGE ANALYSING

This is a continuation of application Ser. No. 88,543, filed Nov. 12, 1970, now U.S. Pat. No. 3,743,772.

This invention concerns image analysis and in particular a system for reducing the effect of background shading introduced by variation in sensitivity over the target area of a source such as a camera tube.

In the image analysis system described in our U.S. Pat. No. 3,617,631 a scanned electrical video signal from a television camera is detected by threshold discriminator means for subsequent analysis. When background shading is present in such a system the same feature will produce a different amplitude video signal when located in different parts of the camera field of view.

It will be appreciated, that the source may be any form of optical to electrical signal converter employing regular line scanning with or without interlace over the field of view or, random access as in a flying spot scanner.

Shading distortion appears as a modulation of the video signal output from the source with a component which is related to the position of the scanning spot. The shading distortion is caused by uneven illumination of the target surface, non-homogeneity and non-uniformity in thickness of the target material, and fall-off in transfer efficiency as the scanning beam diverges from the central axis of the scanning system. The distortion is usually parabolic in either or both of the two conventional scanning directions (i.e. line and frame direction) and the conventional method of correction employed in broadcast systems consists in applying one or more correcting signals of generally parabolic form with respect to time, to the video output from the source. These waveforms are generated by special oscillators and waveform correcting circuits which are synchronised with the scanning system.

The chief problem associated with shading in image analysis, lies in the incorrect detection which results from the application of a fixed threshold to a video signal from a source suffering from shading distortion. Since the same feature will produce a different amplitude video signal when located in different parts of the field of view of a source suffering from shading distortion, similar features located at different points in a field of view will be detected at different threshold levels depending on the shading characteristic. Where a threshold level which is near to the black level of the video signal is employed, only a low level of inaccuracy is introduced in the detection due to the shading. However, where the threshold level is set near to the white level of the signal, severe detection inaccuracies can result, due to some features being detected which should not be and others not being detected when they should be.

The measure of improvement obtained by applying standard broadcast correction techniques as previously described, is insufficient if it is desired to correct the source output for an accurate image analysis system which relies on the accurate detection of feature information in a video signal.

It is therefore an object of the present invention to provide a method by which the effect of background shading can be largely eliminated.

It is another object of the present invention to provide apparatus by which background shading can be eliminated from the output from a camera which may employ fixed scanning with or without interlace, or random access scanning.

If a television camera views a plain evenly illuminated white background, the output signal should be such as to generate a plain white unmodulated display on a television picture tube. Shading distortion causes dark patches in the display and can be thought of as varying the relationship between the camera output and the brightness of the image viewed by the camera relative to the position of the point under consideration in the field of view.

It is thus a further object of the present invention to control the relationship between the output of the camera and the brightness of the image viewed by a source for all points in the field of view.

According to the present invention a method of correcting the shading distortion in a video signal source comprises the steps of storing shading information for each of a plurality of separate regions which together make up the scannable region of the source and modifying either the output thereof or the operation of a signal processing stage in the path of the source output by the information corresponding to at least the region containing the point to which the video signal relates so as to increase the brightness level of the output signal in the shaded regions.

Conveniently the regions correspond to the areas between two sets of imaginary parallel lines drawn across the scannable region, the two sets of lines being perpendicular. In such an arrangement the regions can be thought of as being arranged in a matrix of rows and columns and where line scanning is employed, one set of lines is conveniently made parallel to the line scanning direction.

Preferably the modification of the brightness level is achieved by a correction signal derived from the information corresponding to at least the region containing the point from which the video signal arises. To avoid sudden changes in the correction signal as the point crosses from one region to the next, the information from which the correction signal is derived, is preferably obtained from more than one of the regions at any one instant. Thus in a preferred method, the correction is derived from information from four adjacent regions for any point which lies within an imaginary rectangle drawn between the four points defining the centres of the four adjacent regions.

According to a particularly preferred method, the information from the four adjacent regions is interpolated for any point within the previously mentioned imaginary rectangle, in dependence on the position of the point relative to the four points defining the corners of the rectangle. In such a method, the information for each region is stored at the centre point of the region and the information stored at that point is the actual correction signal required for that point in the scannable region of the source. By interpolating between the centre points of the four adjacent regions and weighting the retrieved information for each point in relation to its distances from the four points, a smoothly varying correction signal can be obtained which varies linearly between the centre points of the adjacent regions.

It will be appreciated that the correction signal derived in this manner will only be absolutely correct at the centre points of the adjacent regions. However any required accuracy of the correction signal can be obtained by dividing the scannable region into a sufficiently large number of separate areas and storing the correction signal information for the centre point of each area.

Where rectilinear scanning is employed, with or without interlace, the correction signal is preferably derived from two points in one line scan separated in the line scan direction and two further points also separated in the line scan direction and contained in another remote line scan so that the first two points are separate from the other two points in the frame scan direction.

Conveniently the modification of the source output is achieved by varying the gain of a variable gain amplifier in the path of the source output, the gain of the amplifier being increased by the correction signal in shaded areas to increase the brightness level component of the video signal (usually the amplitude) in these areas. Conveniently therefore, the information stored at the centre point of each separate area of the scannable region of the source corresponds to the gain control voltage for the variable gain amplifier for that point in the scannable region which is necessary to produce a given brightness level component in the output of the variable gain amplifier. Thus, if no shading correction is required the gain of the amplifier would be controlled to unity and the amplification factor increased from unity where shading correction is required.

In another preferred method, the video signal remains unchanged and the correction signal is applied to a further stage in the image analysis system to which the video signal is also applied. Thus for example the correction signal may serve as or control the generation of a threshold voltage for a threshold detector to which the video signal is applied to vary the threshold voltage in accordance with the shading characteristic of the source. It will be appreciated that the net result will be the same.

According to a further preferred feature of the invention a method of storing shading information for each of a plurality of separate regions which together make up the scannable region of a source of video signal comprises the steps of comparing the video signal output from the source corresponding to a given point in each region with a reference signal, generating a correction signal in response to this comparison, the correction signal being such as to produce a given brightness level component of the video signal if the latter is then modified by said correction signal or if said correction signal controls the mode of operation of a signal processing stage to which the video signal is supplied, and loading the correction signal into a memory in spatial correspondence with the position of the point in the scannable region.

Where the source employs fixed raster scanning the location of the point in the scannable region of the source can be related to time based on the frame and line scanning rates.

The invention also provides apparatus for performing the method according to the invention comprising a multiple location signal store the number of locations corresponding to the number of separate regions which together make up the scannable region of the source of video signal, means for addressing the signal store in spatial correspondence with the position of the scanning spot at any instant to retrieve the information from at least the store location corresponding to the area in which the spot lies and means for modifying the video signal or the operating characteristic of a stage to which the video signal is applied the information retrieved from the store corresponding to at least the region containing the point to which the video signal relates so as to increase the brightness level of the output signal in shaded regions.

Preferably a brightness correction signal is derived from the information stored in the signal store and the information at each location in the store is that which generates the actual correction signal for fully correcting the video output for the midpoint of the area relating to that location in the store. In order to provide a correction signal for the remainder of each area, which varies substantially in accordance with the shading pattern characteristic of the source, interpolation means is provided responsive to the shading information from each of a plurality of adjacent areas of the scannable region of the source one of which is the region containing the point under consideration, the interpolation means serving to generate a correction signal corresponding to a weighted average of the four shading information signals, the weighting of these signals being in proportion to the relative position of the scanning spot at any instant to the four midpoints of the four adjacent areas.

The means for modifying the video output signal from the source may comprise a variable gain amplifier to which the shading correction signal is supplied as a gain control voltage.

Alternatively the means modifying the video signal may comprise a threshold voltage generator for supplying the threshold voltage to a threshold detector to which the video signal is also applied, the correction signal serving as a controlling voltage for the threshold generator to change the threshold voltage in response to variations in the shading pattern characteristic of the source thereby keeping the proportion of the threshold voltage to local amplitude of the video signal, constant. The net effect of allowing the video signal to vary in response to the shading pattern characteristic and simultaneously varying the threshold level in a threshold detector to which the video signal is applied will be substantially the same as employing a fixed threshold level for the detector and correcting the video signal before it is applied thereto.

The invention also envisages apparatus for inserting the shading information into the store locations automatically. One embodiment of automatic loader comprises signal comparator means for comparing the output of a source of video signal with a reference signal, signal generator means responsive to this comparison for generating a signal indicative of a variable parameter of the video signal, means for identifying a store location corresponding to the position of a scanning spot in the source and means for inserting a signal corresponding to the variable parameter into the identified store location.

Another embodiment of automatic loader comprises a source of video signal and means for modifying the video signal therefrom to reduce variation of a variable parameter of the video signal, means for generating a control signal for the video signal modifying means to control the degree modification of the video signal and means responsive to the output from the signal modifying means for comparing said output with a reference signal to generate one of two command signals, means responsive to said command signals to generate a positive or negative increment of signal information, means for identifying a store location in a multiple location store corresponding to the position of the scanning spot in the source of video signal and means for inserting the increment of information signal into the selected store location, said store forming a memory for the means for generating the control signal for the signal modifying means. Assuming the multiple location store is initially empty, the operation of the automatic loader is to insert an increment of information into each store location corresponding to a comparison of the output from the source and the reference signal for each of a number of different points in the scannable region of the source of video signal corresponding to the midpoints of a number of areas into which the scannable region is divided. To this end, during loading the scannable region of the source is scanned in a predetermined sequence which is then repeated. During the repeat scan, the increments of information stored during the previous scan serve to alter the operation of the signal modifying means and the corrected video signal is compared during the second scan with the same reference signal. Further increments of information signal are generated by the increment signal generator and inserted at the same points in the scan into the corresponding store locations if the comparison during the second scan indicates that a further increment of information signal is required to improve the correction of the video signal. During subsequent scans the process is repeated, and, depending on the size of the increments, after a number of scans the store locations will each contain the correct information signal from which a correction signal can be generated which gives the best correction of the video signal in respect of the variable parameter thereof.

The invention also envisages another embodiment of automatic loader comprising signal comparator means for comparing previously modified video signal with a reference signal means for generating a signal indicating that the modification has improved the video signal relative to its unmodified or previously modified condition and means for storing the signal in a store location in a multiple location store in spatial correspondence with the position of the scanning spot from which the video was derived.

Where digital information is to be stored relating to the shading correction required at each selected point in the scannable region of the source, this last described embodiment allows a particularly preferred method of loading to be employed and according to another aspect of the invention therefore a method of generating and storing shading correction information relating to variations due to shading in a source of video signal comprises scanning the scannable region of the source a first time and at selected points applying a correction to the video signal amplitude, comparing the corrected signal with a reference signal at each point, generating one of two binary signals if the corrected signal exceeds the reference signal and the complementary binary signal if the corrected signal is below the reference signal, inserting the generated binary signal into a store location corresponding to the position of the scanning spot at each selected point and during each of $(n-1)$ successive scans applying in turn each of $(n-1)$ different corrections to the video signal and inserting the appropriate binary signal from each comparison into store locations related to those in which the binary signals from the first scan have been inserted, thereby to build up a parallel binary word of $n$ bits describing the correction required at each selected point. This information can then be retrieved by addressing the related store locations in parallel during subsequent scans and interpolating in both line and frame scan directions between the store locations.

Correlator means is required for correlating the position of the scanning spot and the store location and conveniently this same correlator is employed in the device for loading information into the store locations.

It will be appreciated that the invention is not limited to systems in which the regions of the matrix are all of equal size. It is possible to employ closer spacing of the matrix lines in regions of maximum variation such as corners and to arrange the interpolator to take account of the variable matrix spacing.

The invention will now be described by way of example with reference to the accompanying drawings, in which:

FIG. 1 is a diagrammatic representation of a scanner raster divided into sixteen rectangular regions, FIGS. 2*a* to 2*b* illustrate graphically a typical line scan shading distortion curve corrected by applying a single correction for each of the regions of FIG. 1.

FIGS. 2*c* and 2*d* illustrate graphically the line scan shading distortion curve of FIG. 2*a* being compensated in accordance with the method of the present invention.

FIG. 3 is a block circuit diagram of the overall system of the present invention, FIG. 4 is a more detailed block circuit diagram of part of the system of FIG. 3 and in which interpolation between stored correction signals is achieved using integrating circuits.

FIG. 5 is a detailed block circuit diagram of an alternative arrangement to that shown in FIG. 4, FIG. 6 illustrates a system for automatically loading shading correction information into the memory, FIG. 7 illustrates another system for automatically loading shading correction information into the memory, FIG. 8 is a diagram of a vertical interpolator for use in the system of FIG. 5, FIG. 9, illustrates an integrating circuit such as may be employed in the integrators of the system illustrated in FIG. 4.

Figures 1, 2:
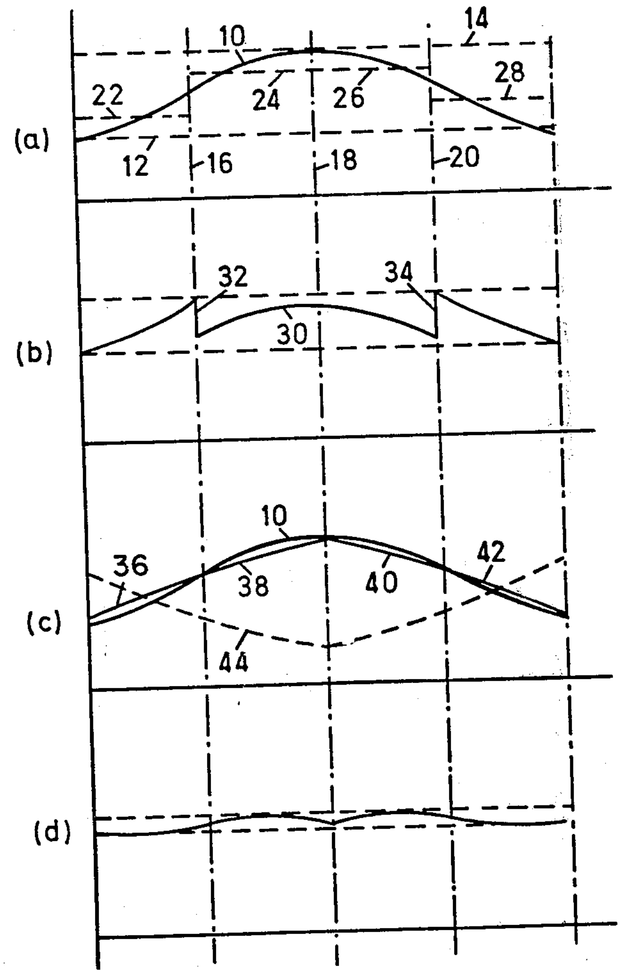

FIG. 1 represents a scanner raster which has been divided into sixteen equal areas A1, B1, C1 etc. Shading correction information for each region is stored in one of sixteen stores forming a memory (not shown) which may be read in correspondence with the scanner position. Thus, while the scanning spot lies in area A1, store A1 is read.

FIG. 2*a* illustrates a typical shading distortino curve in one scan axis direction of a distortion The shading curve 10 varies between a lower level 12 and a higher level 14 of intensity. Let us consider that the curve 10 is for a line scan direction. Vertical lines 16, 28, 20, represent the theoretical dividing lines between regions AB, BC, CD. The mean intensity in region A is shown by the line 22, for the region B by the line 24, C by the line 26 and D by the line 28. Each store would retain the mean intensity information for each area A, B, C etc. and in the most simple arrangement would adjust the output of the scanner by a single multiplication factor in each area.

The shading curve for the scanner output is shown in FIG. 2*b*. The higher level of the lines 24 and 26 relative to the lines 22 and 28 result in a different multiplication factor for the middle portion 30 of the parabolic curve 10 which is thus displaced vertically downwards. Referring to FIG. 2*b* it will be seen that there are two steep steps 32, 34 in the resulting curve for the scanner output. While it is obvious that the peak to peak value of the shading is very much reduced, the steps 32 and 34 result in rapid changes in scanner output signal at this point in the line scan and this can give the image resulting from the scanner output a form of chequerboard pattern.

For some applications this simple form of shading correction may prove sufficient. However, FIG. 3 illustrates a preferred arrangement of the invention which provides a more sophisticated shading correction in a scanning system by which it is possible to obtain a still more uniform intensity over the whole scan.

Figure 3:
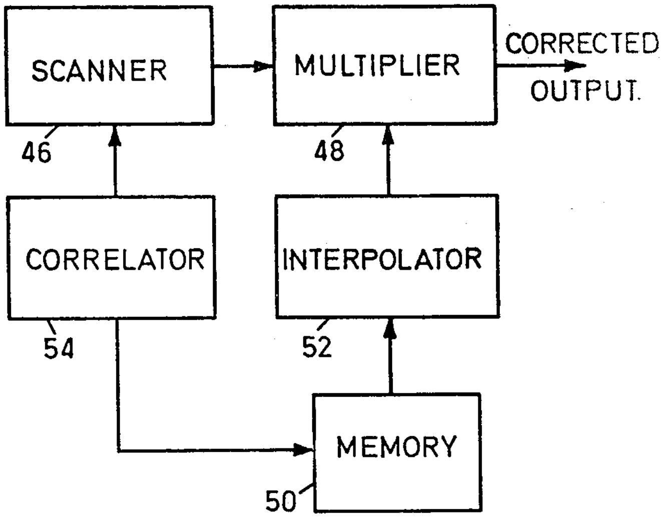

In the arrangement shown in FIG. 3, the information from each store is interpolated before being applied to modify the scanner output thereby producing a smoother correcting signal. FIG. 2*c* corresponds to FIG. 2*a* in that it includes a shading distortion curve 10 for a scanner. Superimposed on the curve are four straight line segments 36, 38, 40, 42 which might be derived from fixed values such as 22, 24, 26 and 28 of FIG. 2*a* by integration, interpolation or some such other technique. The dotted curve 44 corresponds to the inverse of the straight line segments 36 to 42. It will be seen that the derived values closely follow the parabolic curve 10 and by employing a correction factor which is derived from these values the curve 10 can be reduced substantially to a horizontal straight line shown in FIG. 2*d*.

The arrangement shown in FIG. 3 comprises a scanner 46 whose video output is applied to a signal multiplier from which is to be obtained a correct video signal as regards uniformity of raster intensity. A correction factor for applying to the signal multiplier 48 is derived from information stored in a memory 50, the information being interpolated by an interpolator 52 before being applied to the multiplier 48.

Figure 10:
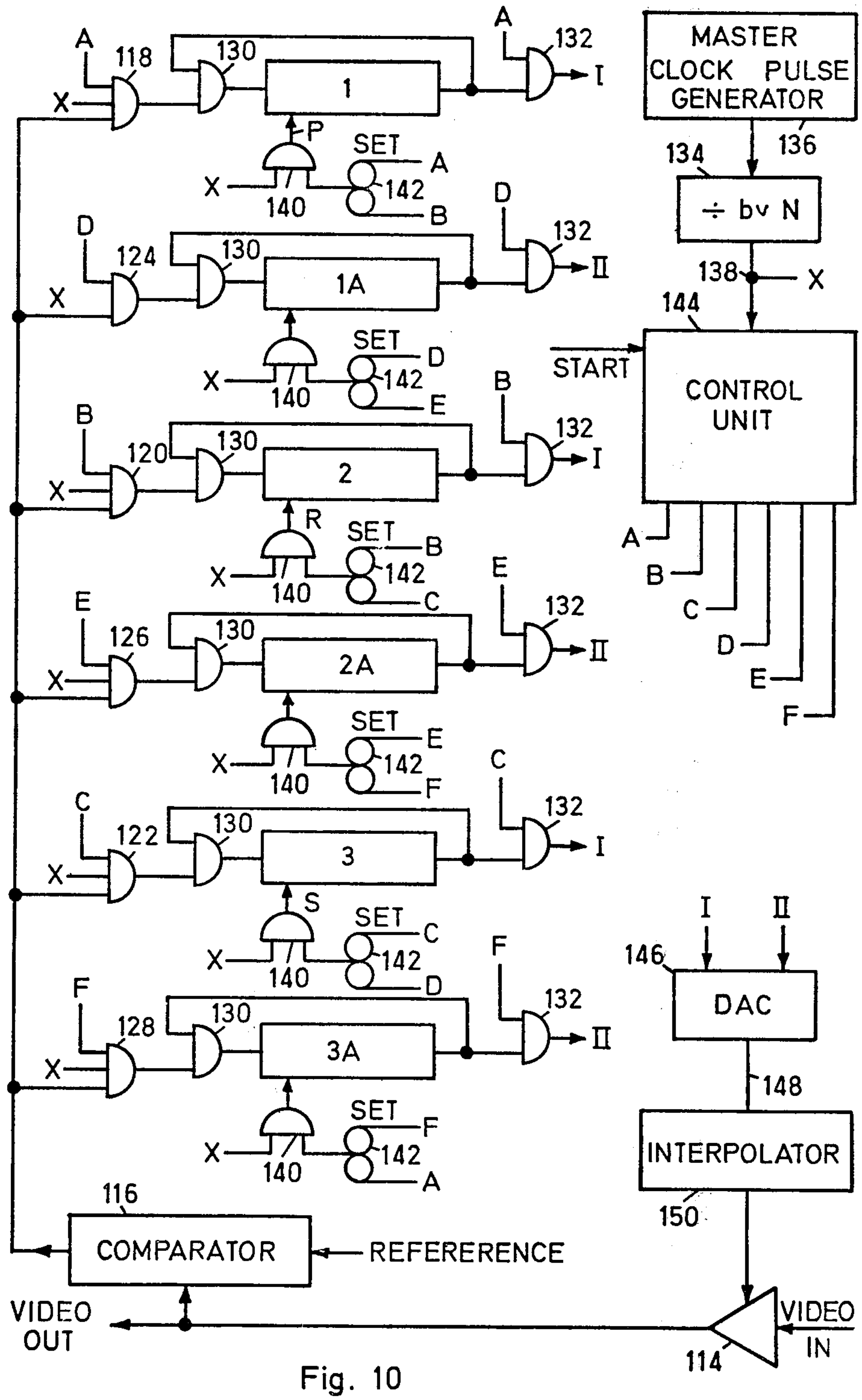
FIG. 10 is a detailed diagram of the system of FIGS. 3 and 7 including the details of the correlator system.

In the simple arrangement illustrated in FIG. 1 in which the raster is divided into sixteen rectangular areas A1 to D4, the memory can be thought of as comprising sixteen individual stores arranged on a 4 × 4 matrix. The information required to derive the correction factor at any instant for the multiplier 48 which can for instance be a variable gain amplifier can then be obtained by scanning the matrix in the appropriate manner in correspondence with the line and frame scan. To this end a correlator device 54 which synchronizes the position of the scanning spot with the reading of the stored location is provided. The correlator 54 is a timing device the particular design of which is within the skill of those in the art and which in the specific embodiments of the invention includes a scan timing generator, and address decoders as shown in FIGS. 4 and 5 and a clock pulse generator and control unit as shown in FIG. 10.

Figure 4:
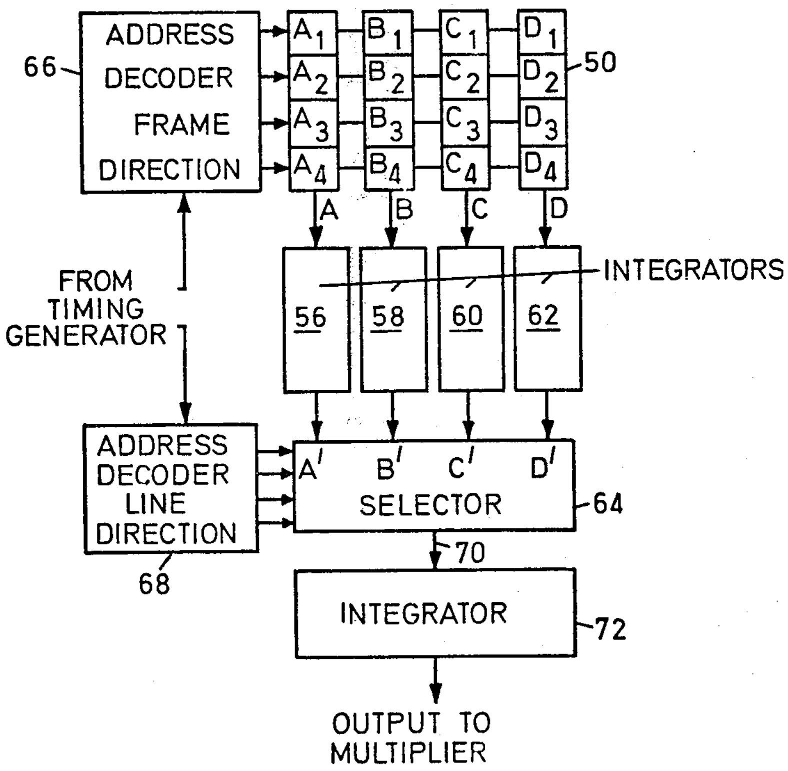

FIG. 4 illustrates in more detail one way in which the information can be extracted from the memory 50 when using a continuously scanning system such as a television camera. As before, the memory 50 in FIG. 4 can be thought of as comprising a matrix of individual stores and for simplicity the model of a 4 × 4 matrix described with reference to the earlier figures will be retained. It will be appreciated however that the systems illustrated in the drawings are not limited to a 4 × 4 matrix and the scanning raster can be divided into any number of regions. The scan timing generator which comprises part of the correlator drives the address decoder 66 also part of the correlator in the frame direction so as to produce four outputs corresponding to the four columns $A_1$ $A_2$ $A_3$ $A_4$, $B_1$ $B_2$ $B_3$ $B_4$, etc. The outputs derived from scanning each of the four columns in the matrix of FIG. 1 appear at four outputs A, B, C and D in the memory 50. Each output is applied to an integrator 56,58,60,62 respectively and the outputs of the integrators 56 to 62 respectively are applied to four inputs A′,B′, C′, D′ of a selector device 64. The output from the scan timing generator is also applied to addressing decoder 68, which serves to scan each of the four inputs A′, B′, C′ and D′ of the selector 64 once during each line scan period. The selector 64 has a single output 70 which is supplied in turn with the signal appearing at the inputs A′,B′ etc. as the latter are scanned by the decoder 68. The signal appearing at the output 70 is applied to an integrator 72 which supplies an output signal which can be applied to the multiplier 48 in FIG. 3.

In order to prevent long term drift and charge carry effects, additional circuit means may be provided to reset the integrators 50, 60 and 72 either at the end of each line scan or each frame scan.

Figure 5:
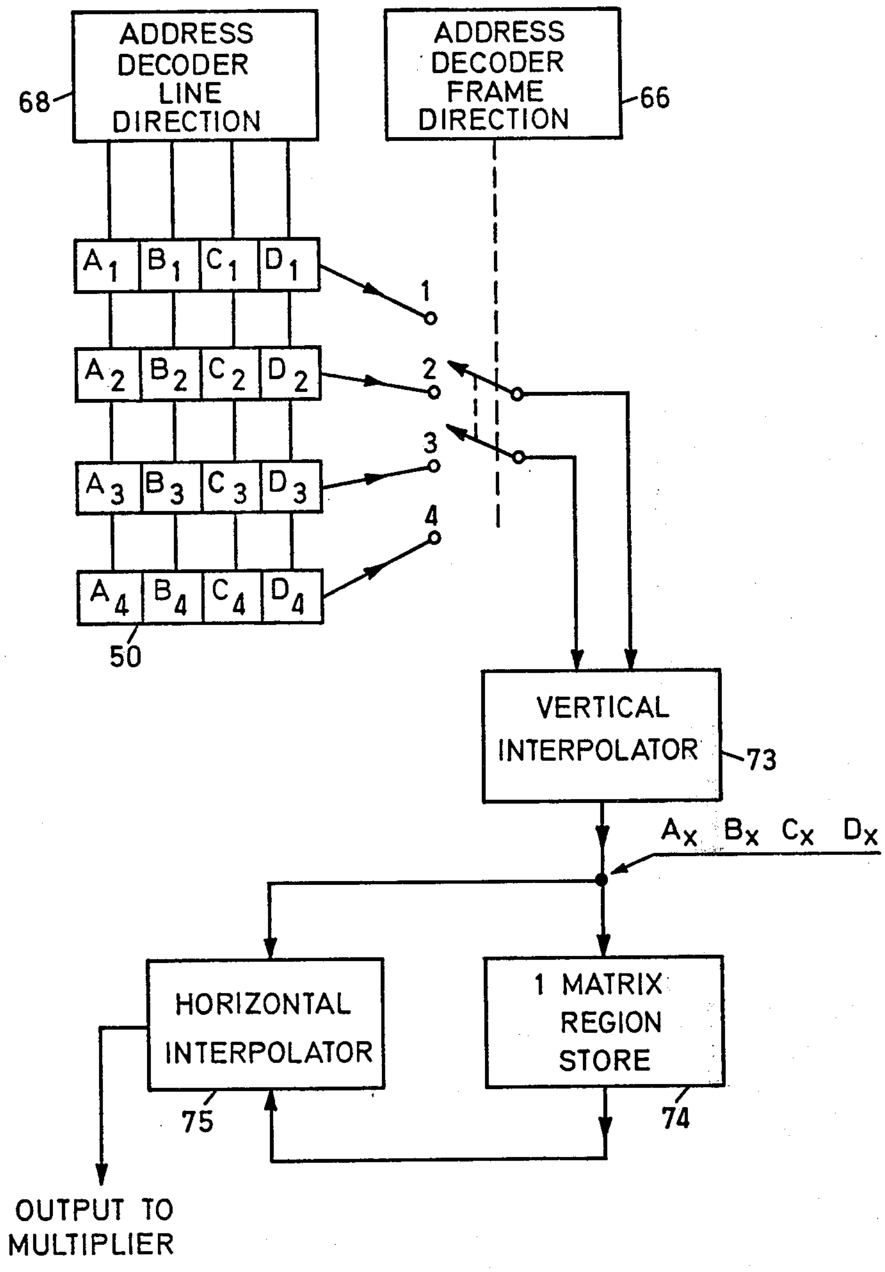

FIG. 5 illustrates in more detail another way in which the information can be extracted from the memory 50 when using a continuous scanning system such as a television camera. As before, the memory 50 in FIG. 5 can be thought of as comprising a matrix of individual, stores and for simplicity the model of a 4 × 4 matrix described with reference to the early figures will be retained. It will be appreciated, however, that the systems illustrated in the drawings are not limited to a 4 × 4 matrix and the scanning raster can be divided into any number of regions. The scan timing generator which is part of the correlator drives the line direction address decoder 68 so as to produce four outputs corresponding to the four rows $A_1$ $B_1$ $C_1$ $D_1$, $A_2$ $B_2$ $C_2$ $D_2$, etc. The outputs derived from scanning each of the four rows appear at the four outputs 1, 2, 3 and 4. The frame direction address decoder 66 which is part of the correlator selects pairs of rows such that the instantaneous point of interest is between the two selected rows. The two selected rows are passed to a vertical interpolator 73 which is arranged to take a weighted mean between the selected rows so as to give a linear interpolation between matrix regions in the vertical direction. This vertically interpolated signal is passed to a delay corresponding to a single matrix region in the line direction 74 so that signals from two adjacent matrix points are available at any moment. These two signals are passed to the horizontal interpolator 75 which performs a similar weighted mean operation in the line direction so that the final correction signal at any instant represents a correctly linearly weighted mean between the four nearest matrix points in the memory.

It will be appreciated that operations such as addressing, decoding, interpolating and the like will introduce finite time delays so that the final correction signal will be shifted in time relative to the actual video signal. To this end appropriate time delays (not shown) are inserted to maintain correspondence between the correction signal and the scanned raster. However these have not been described since they do not materially affect the described embodiment and it will be obvious to one skilled in the art as to where they should be inserted.

Since the correction signal is to be applied so as to reduce the variation represented by the curvature of the shading curve 10, the output applied to the multiplier 48 is preferably inverted electrically so as to correspond to the dotted line 44 in FIG. 2*c* and the corrected output signal is then as shown in FIG. 2*d*.

The memory 50 may for example be a bank of potentiometers which are manually individually adjusted to give the required correction voltage at each of the selected points in the scanned region and are then read in synchronism with the scanning. Alternatively any other suitable analogue store may be employed. Alternatively the memory may comprise a bank of digital stores followed by digital to analogue converters.

It will be seen that the invention provides a method of shading correction in which the correction signal is a straight line segment derivation of the shading distortion curve in either or both line or field scan directions.

Figure 6:
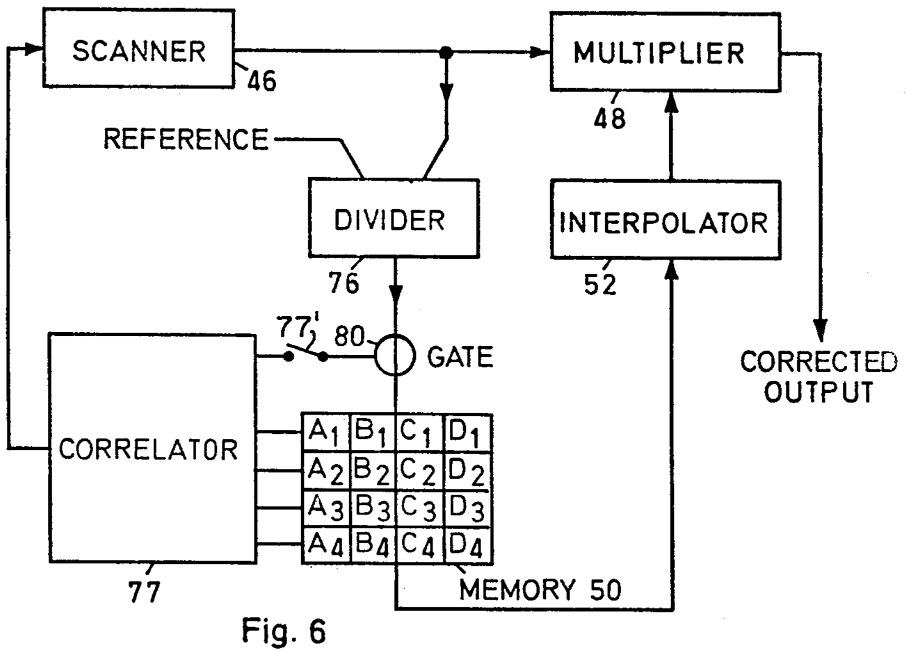

Part of a correction system employing automatic loading is illustrated in FIG. 6. During loading the scanner 46 generates a video signal which passes to a divider 76. This divides a reference signal corresponding to video corresponding to a plain background, by the video signal so as to derive the required multiplying factor. The divider 76 is a standard three terminal device known to those skilled in the art, such as disclosed under reference 1595L, MC 14952, "Micro Electronics Data Book," Motorola Semiconductor Products, Inc. 2d Edition, December, 1969. The correlator 77 controls the position of the spot in the scanner and also addresses the memory 50 in spatial correspondence with the spot position. As the spot passes over each selected point of the scanned region for which shading correction information is to be stored, the correlator opens a gate 80 which passes the output signal from the divider 76 into the appropriate store location in the memory 50. The correction information is thus loaded into the memory.

The information from the memory 50 is interpolated by an interpolator 52 such as illustrated in FIG. 4 or FIG. 5 and the interpolated information is applied to the multiplier 48 to generate a corrected output. In this system, the loading of information can run simultaneously with the interpolation and correction of the output. In the alternative a switch 77' is provided to inhibit the operation of gate 80 by correlator 77 when the memory is fully loaded by opening switch 77'.

Figure 7:
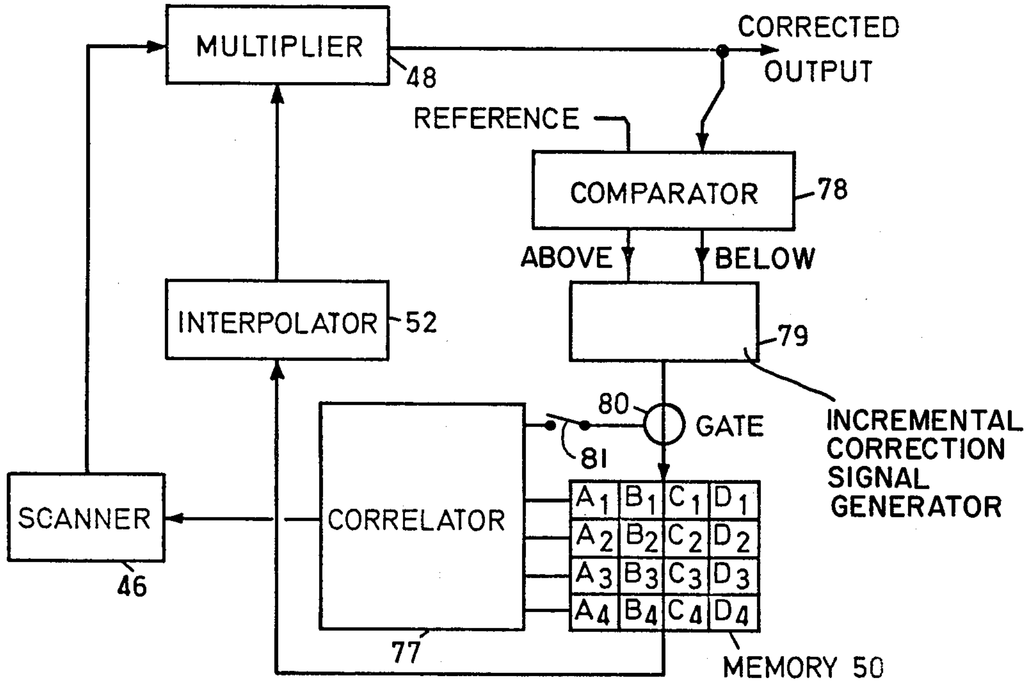

An improved loading arrangement is illustrated in FIG. 7 which eliminates the need for highly accurate circuitry. The scanner output passes through the multiplier 48 to a comparator 78. Here it is compared with a reference voltage. An "above" or "below" signal is generated by comparator if the corrected signal is greater or less than the reference voltage respectively. The "above" and "below" outputs from the comparator control the increment signal generator an "above" signal decreasing the output of geneator 79 and a "below" signal increasing its output. Gate 80 is opened by the correlator 77 at the sampling points at which shading correction signals are to be stored in memory 50, correlator 77 insuring in this way that a correction signal is built up for each sampling point in the appropriate store location in memory 50.

The contents of the memory are interpolated and applied to the multiplier to generate the corrected output as before. It will be observed that this system contains its own feedback loop and so the linearity and gain of the various components will all be compensated automatically. Since the interpolation between matrix points can only be performed with advance knowledge of the adjacent matrix points, it is not possible to run this system in the loading mode simultaneously with the reading mode and a switch 81 is therefore provided to select either mode. Switch 81 is closed during the loading mode but is opened to prevent operation of gate 80 during a reading mode. Since the loading operation will normally be performed on a blank field, this is not a serious restriction on its utility.

When operating at high speeds and particularly when using a fast continuous raster, the system may not have time to settle at each matrix point before passing on to the next. It has therefore been found useful to use a successive approximation method for generating the increment in the increment generator 79. To this end a large increment is applied for the whole of the first scan raster and accepted or rejected at each matrix point according to the output of the comparator 78. During the second and subsequent scan rasters, the results of the first or previous scans are used from the memory 50 via the interpolator 52 and a successively smaller increment of correction is applied to the whole field through the increment generator 79. Just as for the first scan, the disciminator accepts or rejects each of these further increments for each matrix point. In this way, a series of diminishing increments are offered up to the multiplier and accepted or rejected by the comparator 78 until a sufficiently accurate correction has been achieved at each matrix point.

It is to be noted that although we have referred to the amplitude of the video at the matrix points and used similar such expressions, it is not intended that the invention be limited to the use of the video signal at these points alone. The quantity of video signals employed may be adjusted to suit the particular conditions. If the scanner has a high signal to noise ratio, then it is sufficient to take the smallest picture element for the comparison at each matrix point but if the scanner is subject to a fairly high noise level with noticeable random variations, then it is better to take the local average of a plurality of adjacent picture elements for comparison with the reference so as to average out the effects of random variations. It will be appreciated however that this does not affect the basic concept of the invention.

Figure 8:
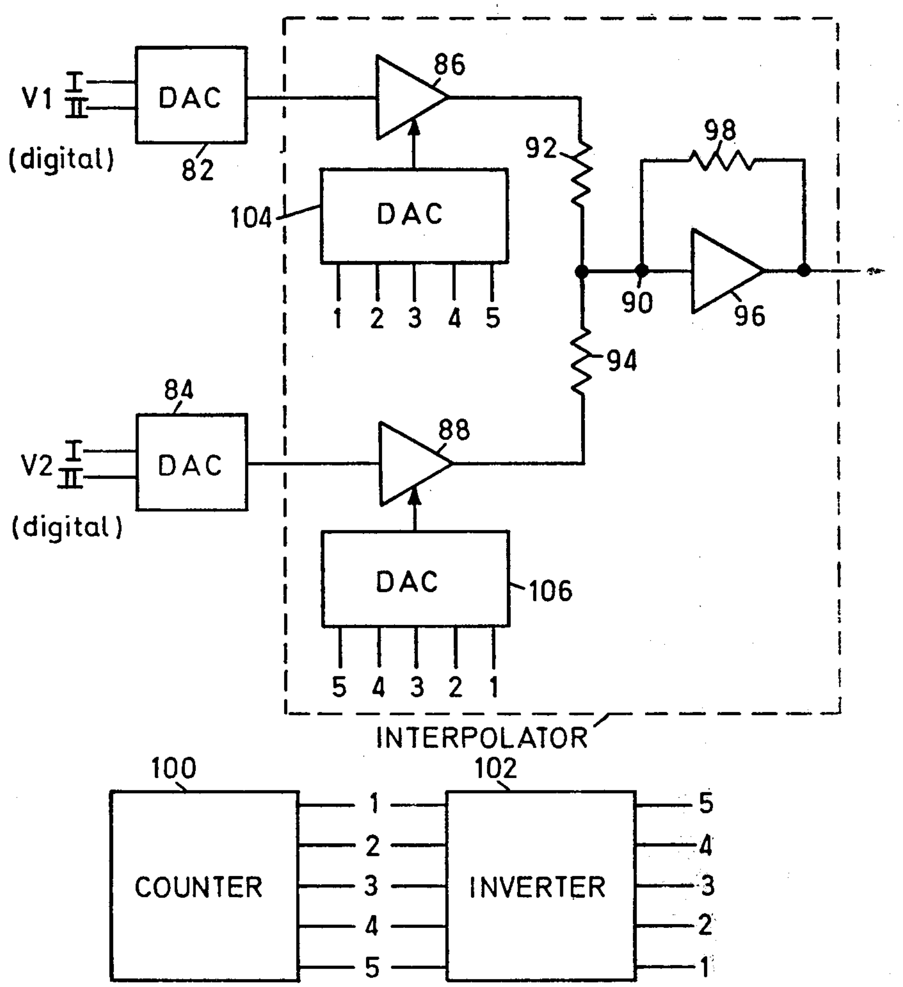

FIG. 8 is a circuit diagram of the vertical interpolator 73 in the system of FIG. 5 where the information relating to shading correction is stored in digital form in the memory 50 and to this end digital information on two lines is shown at inputs V1 and V2 in FIG. 8. The two lines are only typical and any number of levels of digital information may be employed. The two 2-level digital information signals are supplied to two digital to analogue converters, 82 and 84, which supply analogue outputs to two variable gain amplifiers, 86 and 88 respectively. The outputs from the two variable gain amplifiers, 86 and 88, are supplied to a common junction, 90, via two summing resistors, 92 and 94. The junction 90 serves as an input for a further amplifier 96 having a linear feedback loop indicated by resistor 98 between the output and input thereof. As is well known, the output of the amplifier 96 will then represent the sum of the outputs of the two amplifiers 86 and 88 in proportion to the ratios of the two resistors 92 and 94. If these two resistors are made equal then, the outputs of the two amplifiers will be added equally.

A gain control voltage for each of the two amplifiers 86 and 88 is derived from two further digital to analogue converters, 104, 106 one of which is supplied with digital information running from 1 to a number corresponding to the number of scan lines between lines containing selected points at which correction signals are stored and the other of which is supplied with digital information running in the opposite direction down to 1. This digital information is conveniently derived from a single digital counting circuit, 100 is a standard counter-means known to those skilled in the art adapted to count each successive group of five line scans and which supplies a digital output signal running from 1 to 5 and a binary inverting circuit, 102, which produces an output of 5 for input of 1 and 4 for a count of 2. The output from the counter 100 is then supplied to the digital to analogue converter, 104, and the output of converter 102, to the digital to analogue converter, 106.

For simplicity, counter 100 and inverter 102 have been given a capacity of 5, but it is to be appreciated that this is only typical and any number of lines may be employed between scan lines containing matrix points.

Figures 8A, 8B:
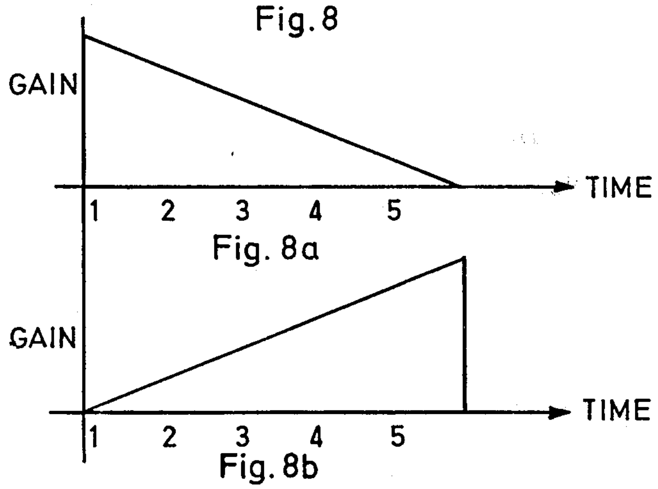

The variation of gain for amplifier 86 for count pulses from 1 to 5 is shown in FIG. 8*a*, and the variation of gain for amplifier for 88 for the same count pulses 1 to 5, as shown in FIG. 8*b*.

Figure 9:
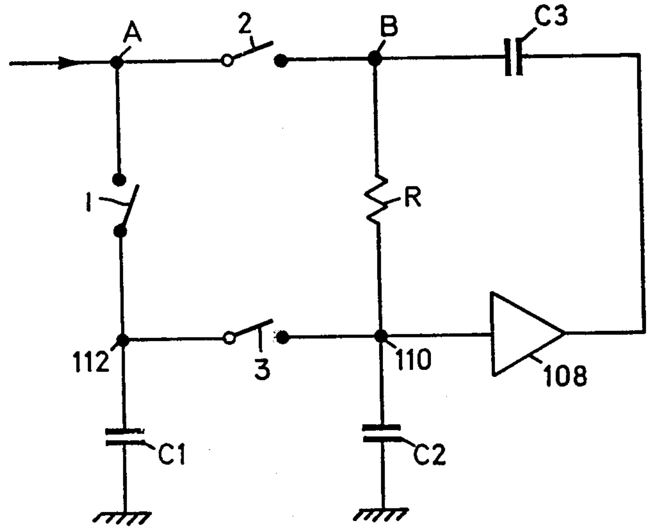

FIG. 9 illustrates one possible form of integrator for use in the system as shown in FIG. 4. The circuit is based on the conventional boot strap amplifier and integrator circuit and comprises an amplifier, 108, having a feedback loop between its output and input containing a capacitor, C3, and resistor R. The input junction 110 for amplifier 108, is connected to ground through a capacitor C2. Analogue information from the vertical interpolator, 73, is supplied to junction A and three switches, 1, 2 and 3, serve to supply the analogue information at junction A to either junction B or junction 110, or junction 112. This latter junction is also connected to ground through capacitor C1. Operation of switches 1, 2 and 3 is controlled by correlator 77.

Although the actual values of the capacitors and resistor must be determined for a particular circuit, in general the value of capacitor C1 will be much greater than capacitor C2, and it has been found that capacitor C2 and capacitor C3 may be of the same order of magnitude.

The operation of the circuit can be best described by first considering the condition in which no charge is contained in capacitor C1, C2 or C3 and no signal appears at junction A. If switch 1 is then closed, capacitor C1 is charged to the potential at A which in this case is zero volts. Switch 1 is then open.

It is now considered that the voltage at junction A rises to V1.

Switches 2 and 3 are then closed momentarily during which time the new voltage at junction A appears across resistor R and C3 is charged to the new voltage V1 very rapidly.

After switches 2 and 3 are opened, capacitor C2 begins to charge up to the target voltage of V1 through the resistor R. During this time, switch 1 is closed and capacitor C1 is charged to the potential at junction A, which is assumed to remain the same, i.e. V1. Switch S1 is then opened.

At the next matrix point, the analogue voltage at A will vary to say V2. After this change, switches 2 and 3 are closed momentarily and the difference between V2 and V1 appears across R due to the stored charge in C1. C3 thus becomes charged to this difference potential and switches 2 and 3 are then opened. As before switch 1 is closed momentarily to allow capacitor C1 to charge to the new voltage V2 and switch 1 is then opened.

During this time capacitor C2 continues to charge but now at a different rate since the aiming voltage across capacitor C3 has altered to V2 - V1.

It is important to note that although the device is based on a well-known so called boot strap integrator circuit, the value of C3 (which is normally much greater than the value of C2) may be made equal to C2 by increasing the gain of amplifier 108.

FIG. 10 illustrates a simplified system for storing digital information relating to the shading characteristic of a source of video signal. Video signal from a source not shown is applied to the input of a variable gain amplifier 114 which serves the same function as multiplier 48 of FIGS. 3, 6, and 7, whose output provides the corrected video signal for subsequent image analysis. This corrected signal is compared in a comparator, 116, with a reference voltage derived from a generator (not shown). A comparator 116 is arranged to provide a binary signal output such that a 1 signal appears if the comparison indicates that the amplitude of the corrected video signal is still less than the reference voltage and a zero output signal if the comparison indicates that the amplitude of the corrected video signal is greater than the reference voltage. The binary output from the comparator is applied to one of three inputs of each of six AND gates 118 to 128. Gating signals are supplied to the other two gates of each of the AND gates 118 to 128 (which will be described later) such that the output from the comparator 116 is applied to one of the six shift registers 1 to 3*a* via one of six 'OR' gates 130 situated in the input circuit to each of the six shift registers 1 to 3*a*. The output of each shift register is connected to the other input of each 'OR' gate 130 and is also supplied as one input to a further 'OR' gate 132 situated in the output of each shift register 1 to 3*a*.

It will be seen that the feedback connection between the output and input of each shift register via an 'OR' gate 130 provides a recirculatory path for information stored in each shift register so that once digital information has been stored therein, it can be retained indefinitely. However the information can be removed from this store and the store thereby cleared by simply open circuiting the feedback loop between the output and input of any shift register by acctuating the shift register to deliver the stored information to the output thereof.

Operation of each shift register is achieved by means of shift pulses derived from a divide circuit 134 which is in turn driven from a master clock pulse generator 136 which together with divide circuit 134 comprises the scan timing generator previously described. The divide circuit 134 is arranged to divide the frequency of the clock pulses by a number equivalent to the number of matrix points in each line. Thus, if there are to be three matrix points per line, the clock pulse frequency will be divided by three. Pulses from the junction 138 (denoted by X) are supplied to one input of each of six 'AND' gates 140 whose outputs deliver shift pulses to each of the six shift registers 1 to 3a. The other input of each AND gate 140 is only supplied with a gating signal when a bistable 142 is SET. To this end each bistable 142 have two inputs one for 'setting' and one for 'resetting' the device. In the case of the bistable 142 related to shift register 1, the leading edge of the gating signal supplied to the 'AND' gate 118 serves as a 'SET' signal (denoted by A) and the leading edge of the gating signal supplied to the 'AND' gate 120 serves as the RESET signal for bistable 142. Signals serving as 'SET' and 'RESET' signals for the other bistables 142 are denoted accordingly.

Figure 11:
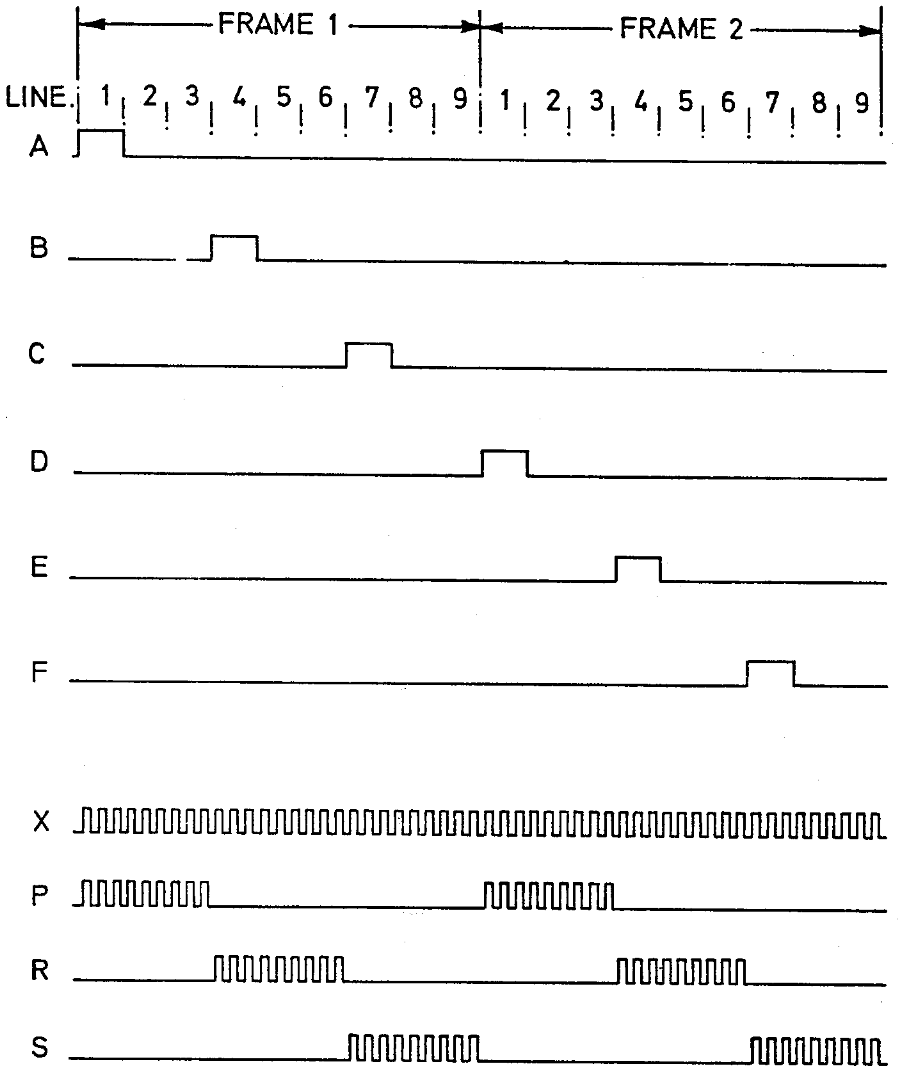
FIG. 11 is a graphical representation of waveforms at marked points in FIG. 10.

The other important circuit elements in the circuitry in FIG. 10 comprise the control unit 144 to which a start signal can be applied as shown and which delivers six gating signals at outputs A to F each gating signal lasting for the duration of one line scan and the signals following one another in succession as indicated graphically in FIG. 11 of the drawings. It will be seen that the total output from the control unit 144 spans two complete frame scans in the simple arrangement shown in FIG. 10. In practice however the control unit 144 will serve to produce gating pulses similar to those shown over a large number of scans or until some correction criterion has been satisfied. Further the outputs from the 'OR' gates 132 in the outputs of shift registers 1, 2 and 3 are commoned and serve as a first level input to a digital to analogue converter 146 and the outputs from the 'or' gates 132 relating to shift registers 1*a*, 2*a* and 3*a* are also commoned and serve as a second-level input for the digital to analogue converter 146. An input on level I for the digital to analogue converter 146 is arranged to provide a first analogue level of correction signal and an input on level II of the input to the converter 146, to provide a lower level of analogue level of correction. Both analogue correction signals appear on line 148 which serves as an input to the interpolator stage 150 which is not shown in detail in FIG. 10. The output from the interpolator 150 serves as a gain control signal variable gain amplifier 114 in the signal path of the video signal.

The detail of DAC 146 and interpolator 150 is given in FIG. 8. For clarity the two DAC's 82 and 84 of FIG. 8 have been combined in single unit 146 in FIG. 10. The connections to the digital to analogue converter 146 and between it and the interpolator 150 are only shown very diagramatically and in fact the outputs from the various OR gates 132 would be read in pairs as described with reference to FIG. 5 and interpolation carried out between each selected pair of outputs. Furthermore it will be appreciated that although only two levels of correction have been shown any number of shift registers may be provided for each line of matrix points thereby increasing the number of correction levels and allowing a better correction to be made of the video signal. The outputs from all the shift registers associated with each pair of lines of matrix points are then read in parallel and interpolated between by the interpolator 150.

The operation of the circuit shown in FIG. 10 can be best described by first considering all the shift registers to be emptied and the control unit 144 in the off condition. In this situation only shift pulses X appear at junction 138. If the control unit is now started a pulse of constant amplitude is generated for the duration of the first line containing matrix points shown in FIG. 11. This pulse appears at the input marked A of and gate 118 and the similarly annotated input to 'or' gate 132, thereby presenting a signal at level 1 of the digital to analogue converter input and since there are no other points to be interpolated between at the present time, a correction signal corresponding to the maximum correction signal possible appears at the output interpolator 150 to control the gain of amplifier 114. The amplitude of the video signal is thus corrected to the amount determined by level 1 of the digital to analogue converter 146 and the modified video signal is compared with a reference voltage in the comparator 116.

It is assumed that the source of video signal is looking at a plain white background and the video signal output should therefore be of constant amplitude. Because of shading, the amplitude will vary from the level at which it should be at and it is this variation which the corrector is designed to remove. If the comparison indicates that the initial correction to the video signal exceeds the reference level which is conveniently the peak white level of the video signal as determined by the threshold voltage applied to comparator 116, then the output from the comparator 116 is a binary zero and gate 118 is not opened. It will be appreciated that this condition indicates that the correction applied to the video signal is too much and the next level of correction is to be tried. If however the comparison indicates that the video signal after modification has an amplitude which is less than the reference threshold applied to the comparator 116 then a binary one signal is applied to the remaining input of 'and' gate 118 and since pulse A appears at one input to this 'and' gate, and a 'one' binary signal appears at another input to this 'and' gate, the 'and' gate will pass the coincident gating pulse X which corresponds to the first matrix point in that line. The signal passed by the 'and' gate 118 passes through the 'or' gate 130 and appears as a first piece of information in the shift register 1. The shift register is simultaneously shifted by one position by the same gating pulse X (which is conveniently shifted in time by a small interval by delay means (not shown) so that the input is once again ready to receive further information from the 'or' gate at 130. If before the next gating pulse X appears, the comparator 116 changes its decision due to variation in the amplitude of the original video signal, 'and' gate 118 will remain closed for the duration of the next gating pulse X so that no information is passed to the shift register 1 which is still shifted by one position by the gating pulse X so that the original information now appears at the third shift stage of the shift register, a zero condition appears at the second shift stage and a further shift stage is ready to receive the next item of information at the next gating pulse from junction 138.

This process continues for the duration of pulse A which as previously mentioned lasts for one complete line scan.

The number of shift stages in the shift register 1 is made just equal to the number of gate pulses X generated during each line scan so that binary digit information will be contained at each shift register position at the end of the line scan with the binary digit corresponding to the first matrix point in the first line scan in the last position before the output at the end of the first line scan.

By virtue of the feedback loop between the output and the input to the 'or' gate 130, continued appearance of gating pulses X at the shift pulse input P to shift register 1 will simply recirculate the information stored in the shift register. It will be seen however that as soon as pulse A has disappeared from its input to or gate 132, the output from this gate to the first-level input of digital analogue convertor 146 will be solely dependent on which is stored in shift register 1. Thus, whereas for the duration of the first scan of the first line of matrix points, a first level of correction was applied the whole time to the video signal, in subsequent scans of this first line the maximum correction will only be applied at those matrix points corresponding to store locations in the shift register 1 containing a binary 1-signal.

Since the information stored in the shift register 1 is required during all these scans following the first scan line containing matrix points for interpolation with the information either stored or to be stored in shift register 2, the reset signal for bistable 142 is derived from the leading edge of the next pulse from the control unit 144 which equals pulse B in FIG. 11. FIG. 11 illustrates pulses from a control unit for a line scan of nine lines in which matrix points occur in the first fourth and seventh lines. The system of FIG. 10 is further simplified in that only two levels of correction I and II are possible. Thus during the first scan level I is applied and stored at those matrix points where the first level of correction is less than or equal to the required correction and during the next scan the second and lower level of correction is applied and stored in shift registers 1*a*, 2*a* and 3*a* at those points where the second level of correction either alone or in conjunction with the first level of correction is less than or equal to the correction required for the video signal at those points. To this end three further correction signals are required during the second frame as denoted by D, E & F on FIG. 11. It will be observed that signals D E & F coincide with lines 1, 4 & 7 of the second frame scan.

As also shown in FIG. 11, gating pulses X appear at junction 138 throughout both scans and although not shown during all subsequent scans and the gating pulses which appear during loading at input P and R and S to each of shift registers 1, 2 & 3 respectively are shown in the similarly annontated lines in FIG. 11. Similar groups of gating pulses will appear during the first three, second three and the last three lines of frame two at these inputs and the corresponding inputs to shift registers 1*a*, 2*a* and 3*a* respectively. It will be appreciated that further circuitry (not shown) is required to produce the appropriate groups of shifting pulses for the shift register after loading has been completed to enable for example, both shift register 1 and 1A and 2 and 2A to be read simultaneously.

The control unit 144 is arranged not to deliver any further signals on lines A to F until a further start signal is received by it whereupon the generation of the control pulses in the strict sequence and at the correct instant in time is initiated.

Conveniently the start signal is generated by pressing a "correct" button mounted on the front of the equipment and a synchronising pulse is supplied to the control unit at the beginning of each complete frame scan and the generation of the first of the pulses A to F is delayed until the synchronising pulse is received by the control unit.

It will be appreciated that where a third level of correction is stored in a third set of shift registers 1b to 3b (not shown) three further gating pulses on three more outputs from the control unit 144 are required (not shown) thereby to generate a gating pulse during the 1st 4th and 7th line of the third frame scan in addition to pulses for shift registers 1-3A. Similarly for any further levels of correction contained in 4th or subsequent shift registers at each location. The invention also envisages a non linear distribution of shading correction information and to this end if a greater concentration is required say in the first line of matrix points two possible improvements can be made. First of all the shift registers 1 and 1*a* in FIG. 10 can be increased in capacity say from six stages to twelve stages to thereby provide double the number of matrix points in the first line. At the same time it is necessary to provide a different dividing stage (not shown) corresponding to dividing stage 134 to provide a set of pulses at double the frequency of pulses X for the shift registers 1 and 1*a*.

Secondly, if most shading occurs betwen lines 1 and 3 of the frame scan raster, it would obviously be more desirable for the second row of matrix points previously contained in line four to lie in line three. This can be simply achieved by providing output pulse B during line 3 instead of line 4 so that interpolation occurs between lines one and three and then between lines three and seven. At the same time the capacity of shift registers 2 and 2*a* can also be doubled in line with the previous suggestion for shift registers 1 and 1*a*.

It will be appreciated that in this simple case little improvement can be gained by concentrating the lines of matrix points in one or other of the regions of the raster because of the relatively few scan lines considered to comprise the raster and the relatively few number of lines of matrix points. However, it will be appreciated, that where many hundreds of lines make up the complete scanning raster and a consequently large number of lines of matrix points are available, it is quite feasible to increase the concentration of matrix lines and or matrix points in certain regions of the scan raster - typically the corners and edges of the raster, without losing the overall accuracy of shading correction in the middle of the raster which is usually not so badly affected by shading.

We claim:

1. A method of generating and storing information signals in a memory which on subsequent address can be used to control the amplitude of a video signal so as to correct for shading in each of plurality of separate regions which together make up the scanned region of a source of video signal, each said region being substantially larger in area than the area of a scanning spot, comprising, in combination the steps of, subjecting the scanned region to uniform illumination, for each said region comparing with a constant reference voltage having an amplitude other than zero the video signal amplitude from said source at only a single selected point in that region, generating a correction signal in response to this comparison, the correction signal being such as to produce a given amplitude level of the video signal if the latter is then modified by said correction signal, and loading the correction signals corresponding to said selected points into a memory in spatial correspondence with the position of said points in said scanned region.

2. A method as set forth in claim 1 in which the source employs fixed raster scanning and the location of the points in the scanned region of the source are related to time, based on the frame and line scanning rates.

3. A method as set forth in claim 1 in which the number of selected points per unit area of the scanned region of the source is greater in at least one portion thereof than in the remainder thereof.

4. A method as set forth in claim 1 wherein the video signal amplitude sampled at each selected point is the average of the video signal amplitude at and near the selected point.

5. A method of generating and storing a shading correction signal for each of a plurality of separate points in a scanned region of a source of video signal comprising the steps of: subjecting the scanned region to uniform illumination, scanning the region generating a correction signal and modifying therewith the amplitude of the video signal obtained by scanning the region, comparing the modified video signal amplitude corresponding to each point with a constant reference voltage, generating an information signal from the comparison if the modified video signal bears a predetermined relation to the reference voltage, and storing the correction signal for each point at which an information signal is generated in a memory in spatial correspondence with the position of the point in the scanned region.

6. The method as set forth in claim 5 in which the source employs fixed raster scanning thd the location of the points in the scanned region of the source are related to time, based on the frame and line scanning rates.

7. A method as set forth in claim 5 wherein the modified video signal amplitude sampled at each selected point is the average of the modified video signal amplitudes at and near the selected point.

8. Apparatus for deriving a correction signal for compensating for shading at each of a plurality of selected points in the scanned region of a source of video signal and inserting the derived signal for each point into a store location of a multi-location store, comprising, in combination with a source of video signal and a multi-location store, constant reference voltage source means for generating a reference voltage other than zero volts, signal comparator means for comparing with the reference voltage the video signal amplitude obtained by scanning the region when the latter is uniformly illuminated, means for generating a difference signal whose magnitude is proportional to any difference between the video signal amplitude and the reference voltage, means for addressing the store location appropriate to the position of the scanning of the spot at any instant and means for inserting into the appropriate store location the difference signal which obtains at each selected point.

9. A method of deriving a correction signal in binary digital form for compensating for shading at each of a plurality of selected points in the scanned region of a source of video signal and inserting the binary digital signals into a multilocation store, comprising the steps of, subjecting the scanned region to uniform illumination, scanning the region a first time and applying a first level of correction to the video signal amplitude, comparing the corrected amplitude at the selected points with a reference voltage, generating one of two binary signals if the corrected amplitude exceeds the reference voltage and the other binary signal if the corrected amplitude is below the reference voltage, inserting the generated binary signal into a store location corresponding to each selected point and during each of $(n - 1)$ successive scans applying in turn each of $(n - 1)$ different levels of correction to the video signal amplitude and inserting the appropriate binary signal from each comparison into the store locations corresponding to the selected points thereby to build up a parallel binary word of $n$ bits at each store location describing the level of correction required to the video signal amplitude at each selected point, the corrected video signal amplitude sampled at each selected point being the average of the corrected video signal amplitudes at and near the selected point.

* * * * *